(12) United States Patent
Fuller et al.

(10) Patent No.: US 8,474,268 B2
(45) Date of Patent: Jul. 2, 2013

(54) METHOD OF MITIGATING UNDESIRED GAS TURBINE TRANSIENT RESPONSE USING EVENT BASED ACTIONS

(75) Inventors: Jason D. Fuller, Simpsonville, SC (US);
Derrick W. Simons, Greer, SC (US);
Douglas E. Dean, Greer, SC (US);
Christopher T. Meadows, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1618 days.

(21) Appl. No.: 11/839,708

(22) Filed: Aug. 16, 2007

(65) Prior Publication Data
US 2009/0044513 A1 Feb. 19, 2009

(51) Int. Cl.
*F02C 9/00* (2006.01)
(52) U.S. Cl.
USPC .............. 60/773; 60/39.281; 60/804
(58) Field of Classification Search
USPC .......... 60/773, 39.281, 804; 701/100
See application file for complete search history.

(56) References Cited

U.S. PATENT DOCUMENTS

| | | | |
|---|---|---|---|
| 6,530,210 B2 * | 3/2003 | Horii et al. | 60/39.53 |
| 6,912,856 B2 | 7/2005 | Morgan et al. | |
| 7,100,357 B2 | 9/2006 | Morgan et al. | |
| 7,513,100 B2 * | 4/2009 | Motter et al. | 60/39.3 |

* cited by examiner

*Primary Examiner* — Phutthiwat Wongwian
*Assistant Examiner* — Vikansha Dwivedi
(74) *Attorney, Agent, or Firm* — Dority & Manning, PA (57) ABSTRACT

A method of managing transient events regularly seen during gas turbine operation that may cause undesirable operation and hardware damage. During certain transient operations, a lag may be seen between reference exhaust temperature and actual turbine exhaust temperature. This lag can result in an under-fired condition within the combustion system of variable magnitude and duration. Either fuel split schedules or a control algorithm can be positioned during these transients to prevent combustion dynamics or loss of flame. Combustion dynamics are known to cause damage that may require hardware replacement. Once the transient has completed, normal control operation is resumed.

20 Claims, 8 Drawing Sheets

METHOD OF MITIGATING UNDESIRED GAS TURBINE TRANSIENT RESPONSE USING EVENT BASED ACTIONS

BACKGROUND OF THE INVENTION

The present invention relates generally to controllers for a combustion system for a gas turbine. In particular, the invention relates to a combustor control for a Dry Low $NO_x$ (DLN) combustor.

Industrial and power generation gas turbines have control systems with controllers that monitor and control their operation. These controllers govern the combustion system of the gas turbine. To minimize emissions of nitric-oxides (NOx), DLN combustion systems have been developed and are in use. Control scheduling algorithms are executed by the controller to operate DLN combustion systems. Conventional DLN algorithms receive as inputs measurements of the exhaust temperature of the turbine and of the actual operating compressor pressure ratio. DLN combustion systems typically rely solely on the turbine exhaust temperature and compressor pressure ratio to determine an operating condition, e.g., turbine exhaust temperature, of the gas turbine.

Figure 1:
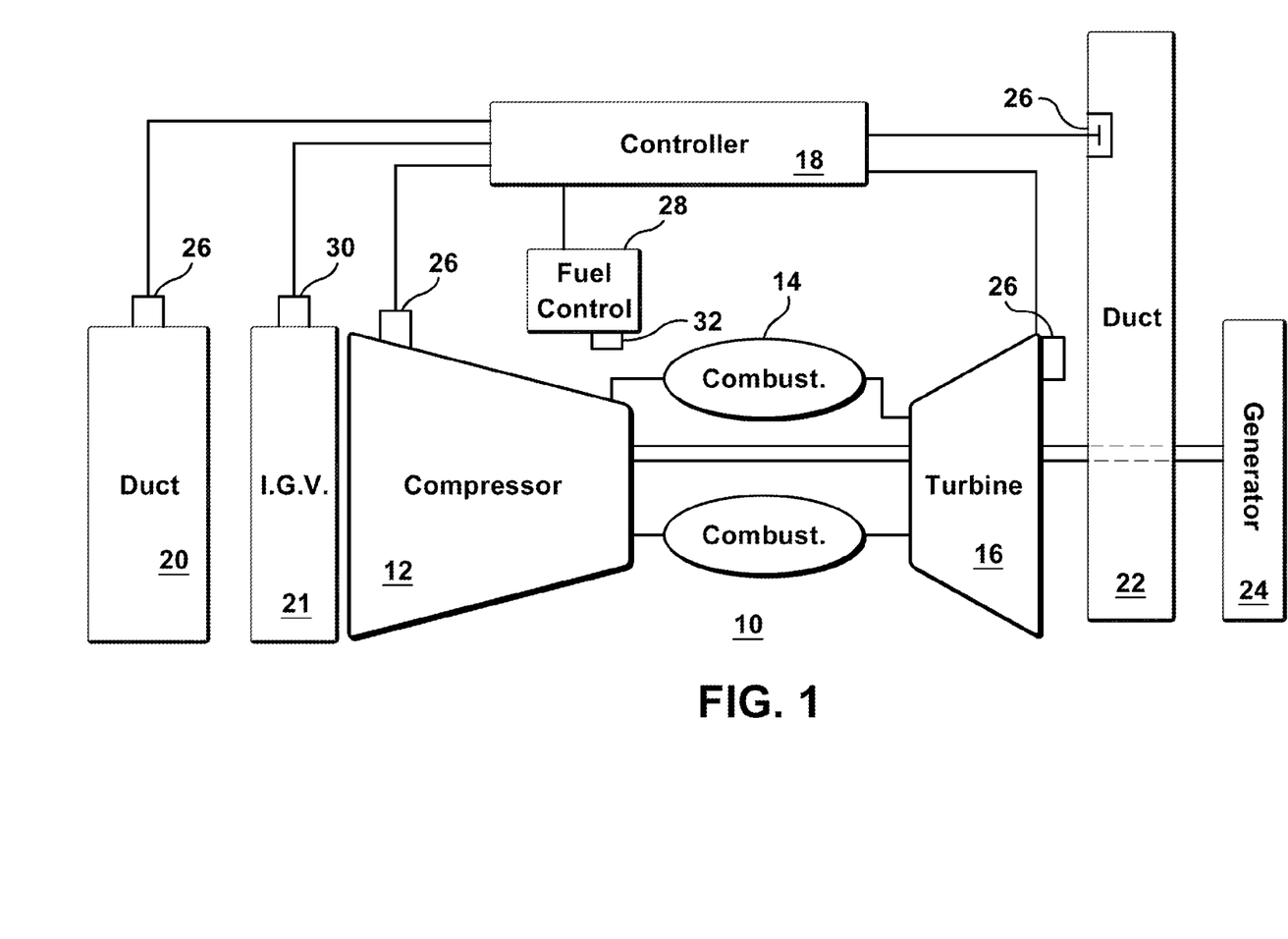
FIG. 1 illustrates a gas turbine having a fuel control system.

FIG. 1 depicts a gas turbine 10 having a compressor 12, a combustor 14, and a turbine 16 drivingly coupled to the compressor and a control system or controller 18. An inlet 20 to the compressor feeds ambient air and possibly injected water to the compressor. The inlet may have ducts, filters, screens and sound absorbing devices that each may contribute to a pressure loss of ambient air flowing through the inlet 20 into the inlet guide vanes 21 of the compressor. An exhaust duct 22 for the turbine directs combustion gases from the outlet of the turbine through ducts having, for example, emission control and sound absorbing devices. The turbine may drive a generator 24 that produces electrical power.

The operation of the gas turbine may be monitored by several sensors 26 detecting various conditions of the turbine, generator and environment. For example, temperature sensors may monitor ambient temperature surrounding the gas turbine, compressor discharge temperature, turbine exhaust gas temperature, and other temperature measurements of the gas stream through the gas turbine. Pressure sensors may monitor ambient pressure, and static and dynamic pressure levels at the compressor inlet and outlet, and turbine exhaust, as well as at other locations in the gas stream. Further, humidity sensors, e.g., wet and dry bulb thermometers, measure ambient humidity in the inlet duct of the compressor. The sensors 26 may also comprise flow sensors, speed sensors, flame detector sensors, valve position sensors, guide vane angle sensors, or the like that sense various parameters pertinent to the operation of gas turbine 10. As used herein, "parameters" and similar terms refer to items that can be used to define the operating conditions of turbine, such as temperatures, pressures, and flows at defined locations in the turbine that can be used to represent a given turbine operating condition.

A fuel control system 28 regulates the fuel flowing from a fuel supply to the combustor 14, the split between the fuel flowing into various nozzles and the fuel mixed with air before flowing into the combustion zone, and may select the type of fuel for the combustor. The fuel control system may be a separate unit or may be a component of a larger controller 18.

The controller may be a General Electric SPEEDTRONIC™ Gas Turbine Control System. The controller 18 may be a computer system having a processor(s) that executes programs to control the operation of the gas turbine using sensor inputs and instructions from human operators. The programs executed by the controller 18 may include scheduling algorithms for regulating fuel flow to the combustor 14. The commands generated by the controller cause actuators on the gas turbine to, for example, adjust valves between the fuel supply and combustors that regulate the flow and type of fuel, inlet guide vanes 21 on the compressor, and other control settings on the gas turbine.

The controller 18 regulates the gas turbine based, in part, on algorithms stored in computer memory of the controller. These algorithms enable the controller 18 to maintain the $NO_x$ and carbon monoxide (CO) emissions in the turbine exhaust to within certain predefined limits, and to maintain the combustor firing temperature to within predefined temperature limits. The algorithms include parameters for current compressor pressure ratio, compressor discharge temperature, ambient specific humidity, inlet pressure loss and turbine exhaust back pressure.

The combustor 14 may be a DLN combustion system. The control system 18 may be programmed and modified to control the DLN combustion system.

Turbine operating temperature and reference turbine operating temperature are important parameters in the control of a gas turbine operation. U.S. Pat. No. 7,100,357 by Morgan et al. described a system for controlling gas turbine by adjusting a target reference exhaust temperature that included a number of environmental factors incorporated in algorithms for calculating a reference temperature for turbine exhaust. The algorithms establish a limiting turbine exhaust temperature based on a $NO_x$ emission limiting algorithm, a CO emission limiting algorithm, a target turbine firing temperature algorithm, and a target turbine firing temperature limiting algorithm. The process may be used to maintain turbine emissions and firing temperature at or below target level, especially as ambient conditions and turbine operating parameter vary. The controller adjusts the fuel control to achieve the target turbine exhaust temperature. This algorithm is known as corrected parameter control (CPC).

Various normal transient operating conditions can result in a temporary difference between reference turbine operating temperature and actual turbine operating temperature. One example is when unloading a unit, the reference exhaust temperature is usually higher than the actual temperature because fuel is decreased first. Then, inlet guide vanes react to the error of actual versus reference temperature, but not to the decrease in fuel to hold firing temperature.

Unfortunately the inlet guide vanes are controlled using turbine exhaust thermocouples, and a known lag exists within the turbine exhaust thermocouples. By the time the turbine exhaust thermocouples register the lower temperature, fuel has continued to decrease. This results in the inlet guide vanes always "trailing" fuel while unloading, creating an under-fired condition.

Typically, significant margin exists on combustion systems in that the under-fire has no significant negative impact. However on advanced ultra low emissions combustion systems, the margins are much tighter. Transient under-fire can result in combustion dynamics or a loss of flame. Combustion dynamics within the combustor are known to damage hardware. Loss of flame in a combustion can creates high spreads, and the plugs are fired returning to Lean Lean, a high emissions mode of operation. A unit trip can also occur on high spreads.

Accordingly, new control algorithms are required to identify and transiently position the gas turbine unit to prevent combustion dynamics or loss of flame.

BRIEF DESCRIPTION OF THE INVENTION

According to one aspect of the present invention, a controller is provided in a gas turbine having a compressor, a combustor and a turbine with a fuel split schedule. The controller includes sensor inputs receiving data regarding actual gas turbine operational parameters and a fuel control system that adjusts fuel splits according to operational parameters.

A processor in the controller executes a program, that includes a set of predetermined gas turbine transient events, for which a lag between a measured reference exhaust temperature and actual turbine exhaust temperature may result in at least one of combustion dynamics and loss of flame. The processor includes a function of recognizing the transient events from the gas turbine operational parameters based on the sensor inputs. The process provides a programmed response to mitigate the effects of the gas turbine transient events on combustion dynamics and loss of flame.

According to another aspect of the present invention, a method is provided for responding to transient events in gas turbine operations, for which a lag between a measured reference exhaust temperature and actual turbine exhaust temperature may result in at least one of combustion dynamics and loss of flame. The method includes sensing input data regarding actual gas turbine operational parameters and determining which event from a set of predetermined transient events has occurred based on the sensed operational parameters. The method further initiates a predetermined priority of response for the predetermined transient event.

In accordance with a further aspect of the present invention, a gas turbine is provided that may include a compressor; a combustor; a turbine; sensors providing data regarding actual gas turbine operational parameters; and a fuel control system, including fuel split schedules according to operational parameters. The gas turbine also includes a controller receiving sensor inputs receiving data regarding actual gas turbine operational parameters. The controller further includes a processor executing a program. The program may include a set of predetermined gas turbine transient events wherein a lag between a measured reference exhaust temperature and actual turbine exhaust temperature may result in at least one of combustion dynamics and loss of flame; a function of recognition of the transient events from the gas turbine operational parameters based on the sensor inputs, and a programmed response to mitigate the effects of the gas turbine transient events on the combustion dynamics and the loss of flame.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including preventing combustion dynamics and flameout during designated transient conditions and allowing continued operation at targeted $NO_x$ levels.

This invention is for a method of managing transient events regularly seen during gas turbine operation and that may cause undesirable operation and possible hardware damage. During certain transient operations a lag may be seen between reference exhaust temperature and actual turbine exhaust temperature. This lag can result in an under-fired condition within the combustion system of variable magnitude and duration. Either fuel split schedules or a control algorithm can be positioned during these transients to prevent combustion dynamics or loss of flame. Combustion dynamics are known to cause damage that may require immediate hardware replacement. Once the transient has completed normal control operation is resumed.

Also during operation the system controller is designed to limit emissions and particularly $NO_x$ emissions to a maximum level based on a running average. Without this invention, long term operation at the target $NO_x$ level would not be possible.

Figure 2:
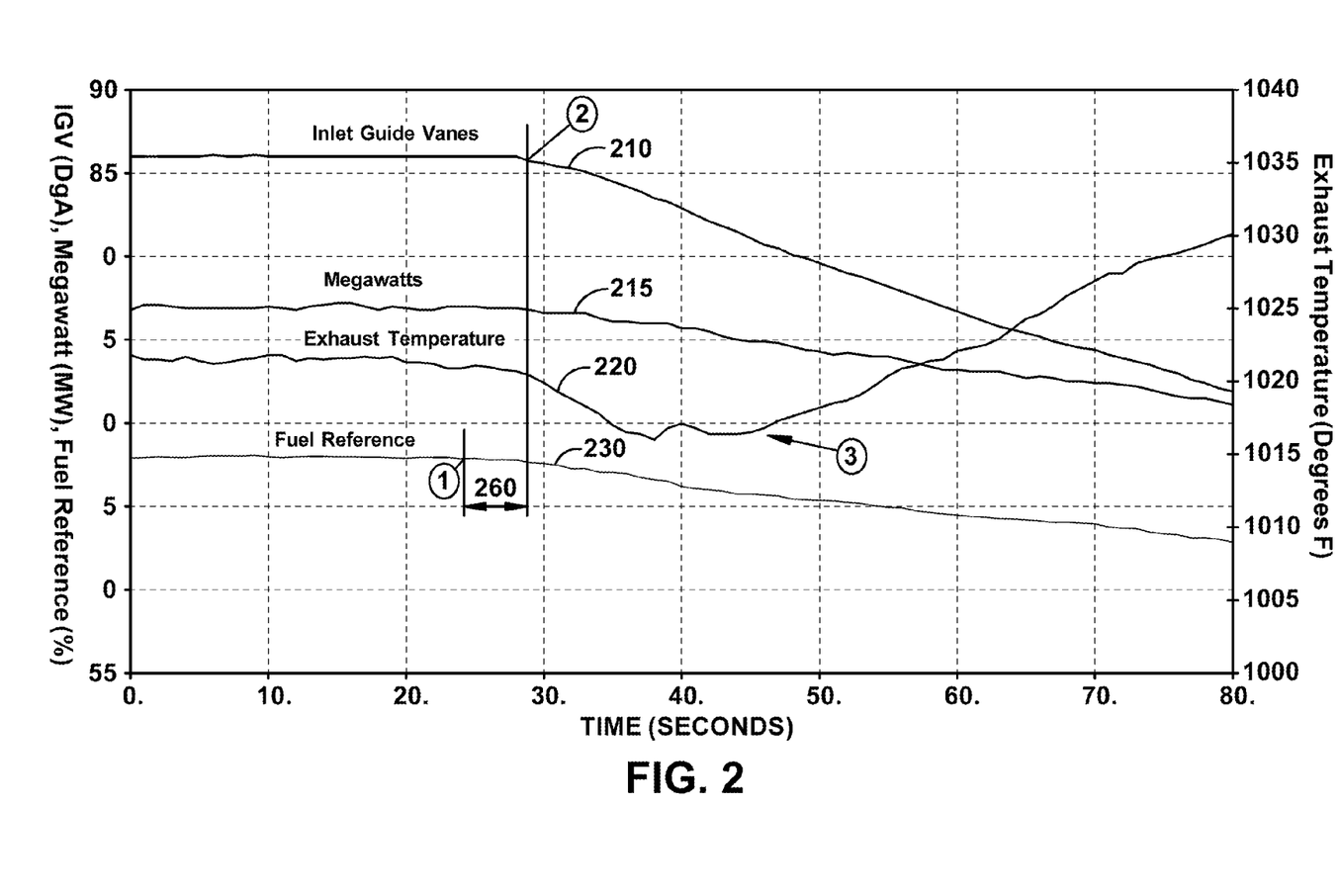
FIG. 2 illustrates a base-load to part-load transient event under a prior art control.

FIG. 2 illustrates a base-load to part-load transient event under a prior art control scheme. Operational parameters, including inlet guide vane position 210, megawatt power output 215, exhaust temperature 220, and fuel reference 230, are tracked during the power transient from base-load to part-load. Fuel reference 230 begins to move at 1. Inlet guide vanes 210 do not begin to close until 2, allowing the turbine to go cold transiently as indicated by exhaust temperature 220. Exhaust temperature continues to drop in response to the reduced fuel, until about 3, then subsequently recovering. The transient drop in exhaust temperature 220 due to the lag 260 between reduction in fuel reference and the closing of the inlet guide vanes 210 may result in combustion dynamics or lean blow out, unless fuel is rapidly provided.

Figure 3:
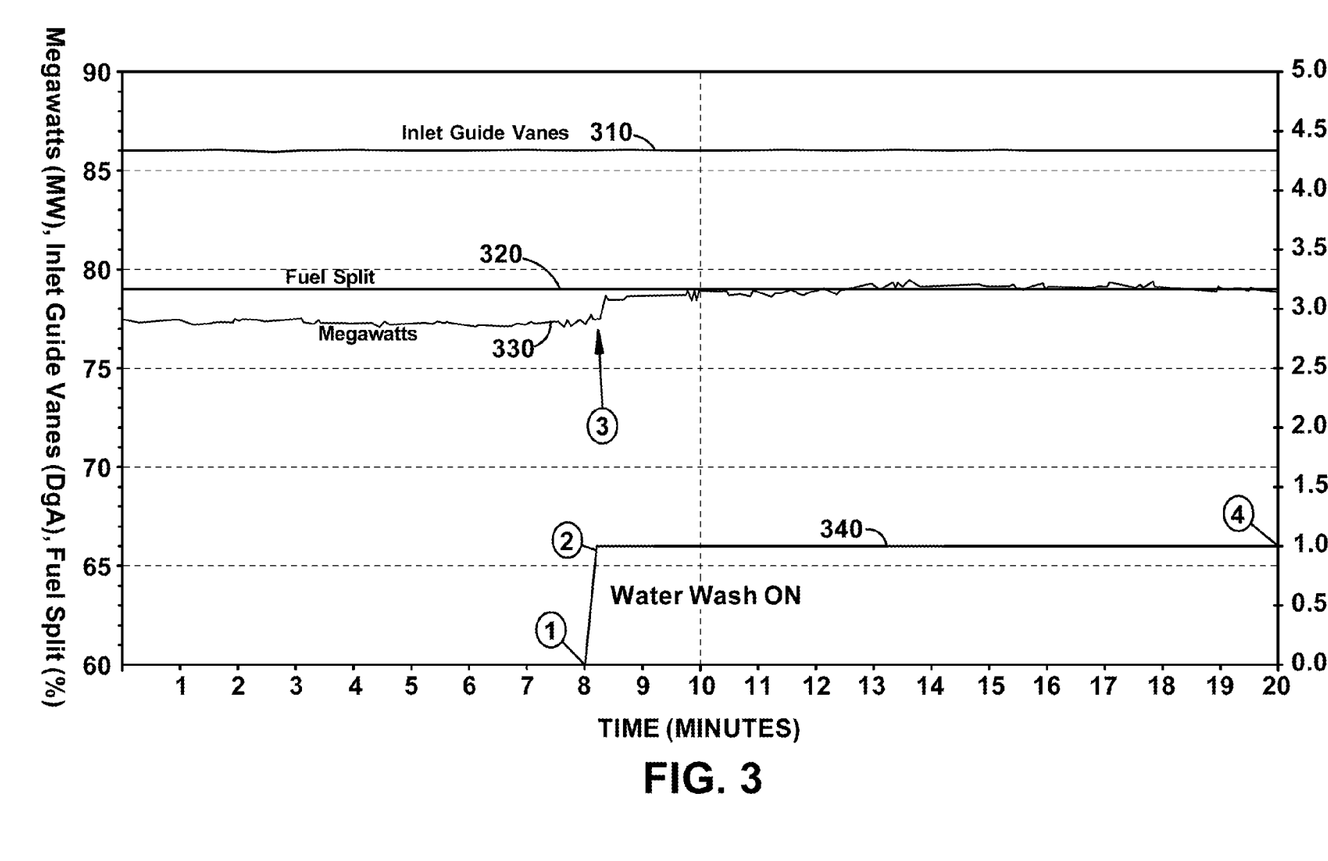
FIG. 3 illustrates a water wash on transient event under a prior art control.

FIG. 3 illustrates a water wash on transient event under a prior art control scheme. Operational parameters identified in the graph include inlet guide vane position 310, fuel split 320, megawatt power output 330, and water wash on sequence 340. At 1, the water wash on 340 is initiated and fully flowing at 2. The megawatt power output 330 responds quickly at 3 to the water wash, stepping up by about 1.5 megawatts. However, with the prior art control, the fuel split 320 is not immediately adjusted in response to the stepped power output brought about by the water flowing into the turbine. Consequently, a cooldown within the turbine results, potentially leading to combustion dynamics or flameout.

The water wash flow is continued in the instant case for at least the duration of the graph (144 seconds) at 4, however the frequency and duration of the water wash is determined by the individual site operator. The water wash may be sustained for even hours. Further, the amount of water being pushed into a unit is dependent upon the number of machines being washed, the number of clogged water wash nozzle and other factors, not under the control of the gas turbine manufacturer. Consequently, a prediction of the impact for a water wash cannot be fixed. Therefore, both an immediate and a long-term response are required to maintain smooth operation and $NO_x$ control.

Aspects of the present invention are divided into two parts. Fuel split action is central to an immediate response. Control algorithm action pushes the unit further from operational boundaries for longer term response by adjusting the emissions model gain.

In some situations an immediate response is required to transiently position the unit to prevent combustion dynamics or loss of flame. The solution for these transient events is to quickly move gas fuel splits, which will have an immediate impact to combustion operability. As the rest of the control algorithm does not realize that fuel splits have been shifted, the change must be ramped back out after the transient event has been cleared.

Gas fuel splits are programmed within existing control algorithms of the gas turbine control. The splits determine how much gas fuel will be divided among various fuel paths for the specific operating condition. Changing the fuel splits results in a more stable flame, albeit with somewhat higher emissions. The altered fuel split is maintained for a predetermined time period. When the change in fuel split is no longer required, then the transient may be ramped off. Operational testing has shown that the predetermined time period for the adjusted fuel split may be set at approximately 60 seconds for a number of operational transients requiring an immediate response, however the predetermined period may be set shorter or longer for different operational transients.

$NO_x$ control for gas turbines may be specified in terms of a maximum time-averaged PPM output. Therefore, limited transient increases in $NO_x$ emissions such as during the adjusted fuel splits of the immediate response can be acceptable, provided the averaged PPM output is not exceeded.

While the unit is operating, the algorithm is continuously looking for transient events that have been identified as potential risks. If a transient event is identified and immediate action is needed to "survive", a step change in gas fuel splits is applied. With the adjusted gas fuel splits, significant margin to both combustion dynamics and lean blow out exist.

Once the risk has passed, the algorithm ramps the gas fuel splits back to schedule. It is possible to have multiple transient events at the same time. The controller continuously monitors for events, each event initiates the sequence there by stretching the hold time if multiple events occur in a short time frame. When the transients subside, fuel splits return to schedule. For an exemplary set of transients, a hold time for the immediate response of fuel split adjustment may be 60 seconds. However, it may be possible that individualized hold times could be applied to specific transients events. If during the hold time for a first transient, one or more subsequent transient events are identified, then the hold time for the subsequent events may be added to extend the duration of the immediate response. At the end of the hold time, the immediate response may be ramped off to schedule.

Other transient situations require a long-term response to prevent a negative impact to turbine operability. One example would be during a water wash. A water wash is an operation where water and possible cleaning agent are introduced into a compressor and flow through the compressor for the purpose of cleaning the compressor blades. When the water reaches the turbine section, the water mass tends to cool the overall flow through turbine, potentially creating combustion dynamics or flameout. An immediate response is required to address the initial combustion dynamics and flameout potential.

However, when a water wash is initiated, the amount of water actually entering the compressor depends on a variety of factors outside of the equipment manufacturer's control. This may include the number of turbines washing at that time and the number of water wash nozzles plugged per unit. Because the impact of each water wash is impossible to predict, a long-term adjustment of the turbine emissions control algorithm is required. The corrected parameter control (CPC) algorithm was previously described relative to U.S. Pat. No. 7,100,357 by Morgan et al. When a transient requiring a long-term response is identified by the controller, the CPC algorithm is "bumped" up so that the unit will transiently run at higher emissions levels increasing the margin to combustion dynamics and flameout potential. Closed Loop Emissions Control then re-tunes the unit to desired emissions levels after steady state water wash operation has been established using emissions feedback data to adjust the controller algorithm.

Corrected Parameter Control (CPC) is used on the ultra low emissions programs, but is not required as part of this invention. CPC generates an exhaust temperature reference that will maintain turbine operation within specified boundary limits, such as emissions limits.

Another option is to apply a long-term response by stepping the emissions model gain. Typically this response is used for transient conditions that are unpredictable. Once the model gain has been stepped, the Closed Loop Emissions Control will retune the model and turbine back to steady state operating condition. Stepping the emissions model does not have a direct fuel split scheduling reaction, but will adjust fuel splits and exhaust temperature reference as required.

If a transient event occurs while the Closed Loop Emissions Control is offline, the emissions model will still be stepped. However without the Closed Loop Emissions Control to tune the unit, the emissions may run slightly higher than desired. If additional transients occur that would require a long-term response the emissions model would continue to be stepped. Without bounds, it would be possible to push the turbine outside the emissions compliant window if these transients continue to occur with the Closed Loop Emissions Control offline. Therefore a counter and permissive have been added to the long-term action to prevent excessive stepping of the emissions model adjustment with the Closed Loop Emissions Control offline. For example, if multiple back-to-back long-term transients occur, the emissions model shall be locked out from taking successive action until at least one Closed Loop Emissions Control adjustment has been made.

The decision initiating an immediate response or a long-term response, or whether both responses are required is based on field experience and testing. Additional transients can be identified and added to the algorithm. The response taken after a transient is detected can also be easily altered from an immediate response to a long term response or visa versa. System operation has been reviewed for transient events that may result from a mismatch of reference exhaust temperature and actual exhaust temperature. Exemplary operations have been identified in TABLE I as to whether immediate response, long-term response, or both responses are required.

TABLE I

| Event | Immediate Response | Long-Term Response |
|---|---|---|
| Base Load to Part Load | Y | N |
| Wash Water ON | Y | Y |
| Wash Water OFF | N | Y |
| Transfer To Premix Purge | Y | N |
| Inlet Bleed Heat Trip | Y | N |
| Closed Loop Emissions Control Tuned Not Greater Than X Hours | N | Y |

TABLE I-continued

| Event | Immediate Response | Long-Term Response |
|---|---|---|
| Spread Event or DLN Modeless | N | Y |
| Load Rejection with Premix | Y | N |
| Data Valid/False | N | Y |
| DLN1 + Recovery Mode | N | N |
| Grid Overfrequency - FSRN will drop | Y | N |
| Grid Underfrequency - Base Load | N | N |
| Grid Underfrequency - Part Load | N | N |
| Compressor Bleed Valve Failure | N | N |
| Part Loading/Unload Pre-Select | N | N |
| Part Loading/Unload Manual Load Lower | N | N |
| Part Loading/Unload Manual Load Raise | N | N |
| Loss of CLEC on Cold Start During Heat Soak | N | Y |
| Spread event-Combustion Trouble Alarm | N | N |

Figure 4:
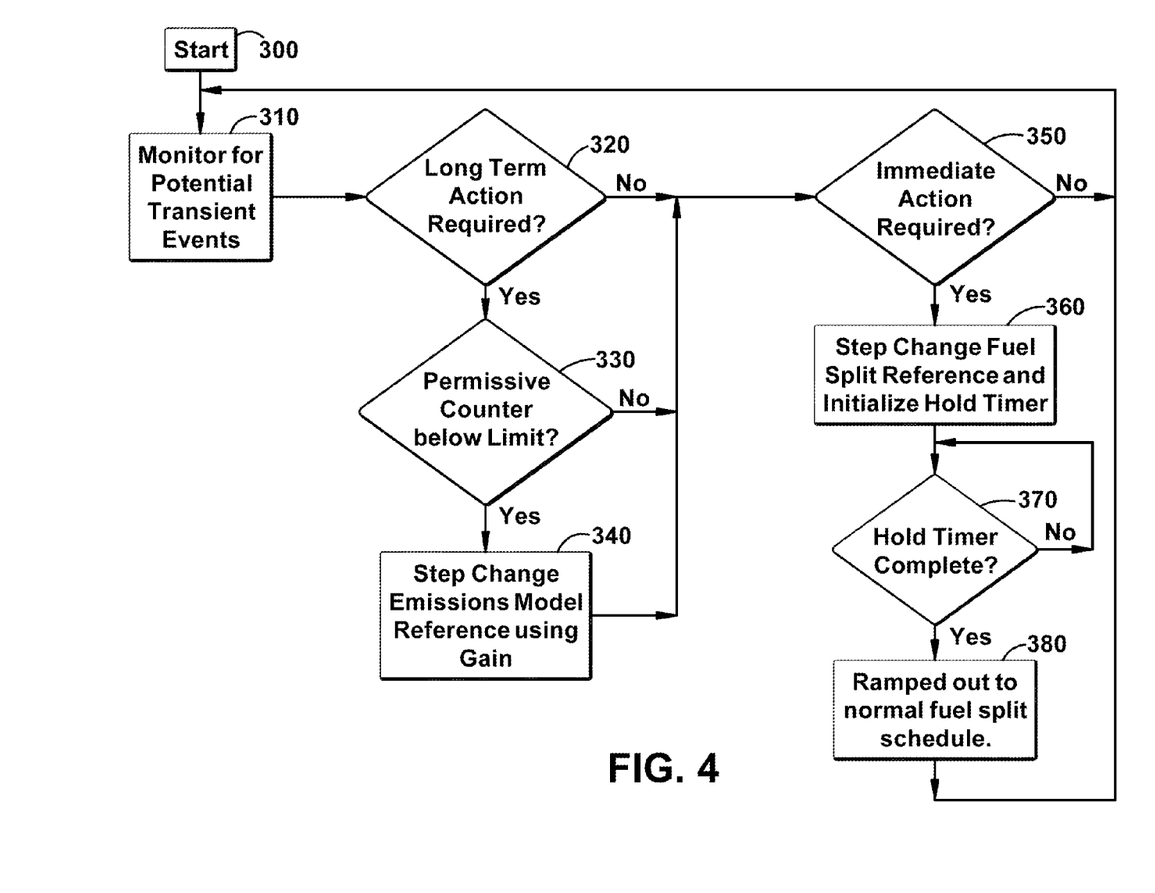
FIG. 4 illustrates an embodiment of an inventive transient event-based control algorithm.

FIG. 4 illustrates an embodiment of an inventive transient event-based control algorithm. The algorithm is started at step 300. At step 310, system parameters are monitored for potential transient events. In step 320, it is determined if long-term action is required. If long-term action is not required, then it is determined in step 350 if immediate action is required.

If long-term action is required in step 320, then a check is made in step 330 to determine if a permissive counter is below a predetermined limit. If the permissive counter is not below the limit in step 330, then it is determined in step 350 if immediate action is required. If the permissive counter is below the limit in step 330, then step change is made to the emissions model reference using the gain and the check for immediate action is performed according to step 350. In a further aspect of the algorithm, if the permissive counter remains below a predetermined limit, changes are made to the emissions model reference gain without an intervening closed loop emission control tuning.

If no immediate action is required according to step 350, then monitoring for potential transients continues according to step 310. If immediate action is required per step 350, then a step change is performed in fuel split and a hold timer is initialized according to step 360. In step 370, a check is made to determine if a hold timer is complete. If the hold timer is not complete, then the hold timer continues to be checked until it is complete. If the hold timer is complete, then the step change in fuel split reference is ramped out according to step 380. In a further aspect of the hold timer, the hold timer may be reset by identifying another transient event requiring short-term action. Monitoring then continues for potential transient events.

Figure 5A:
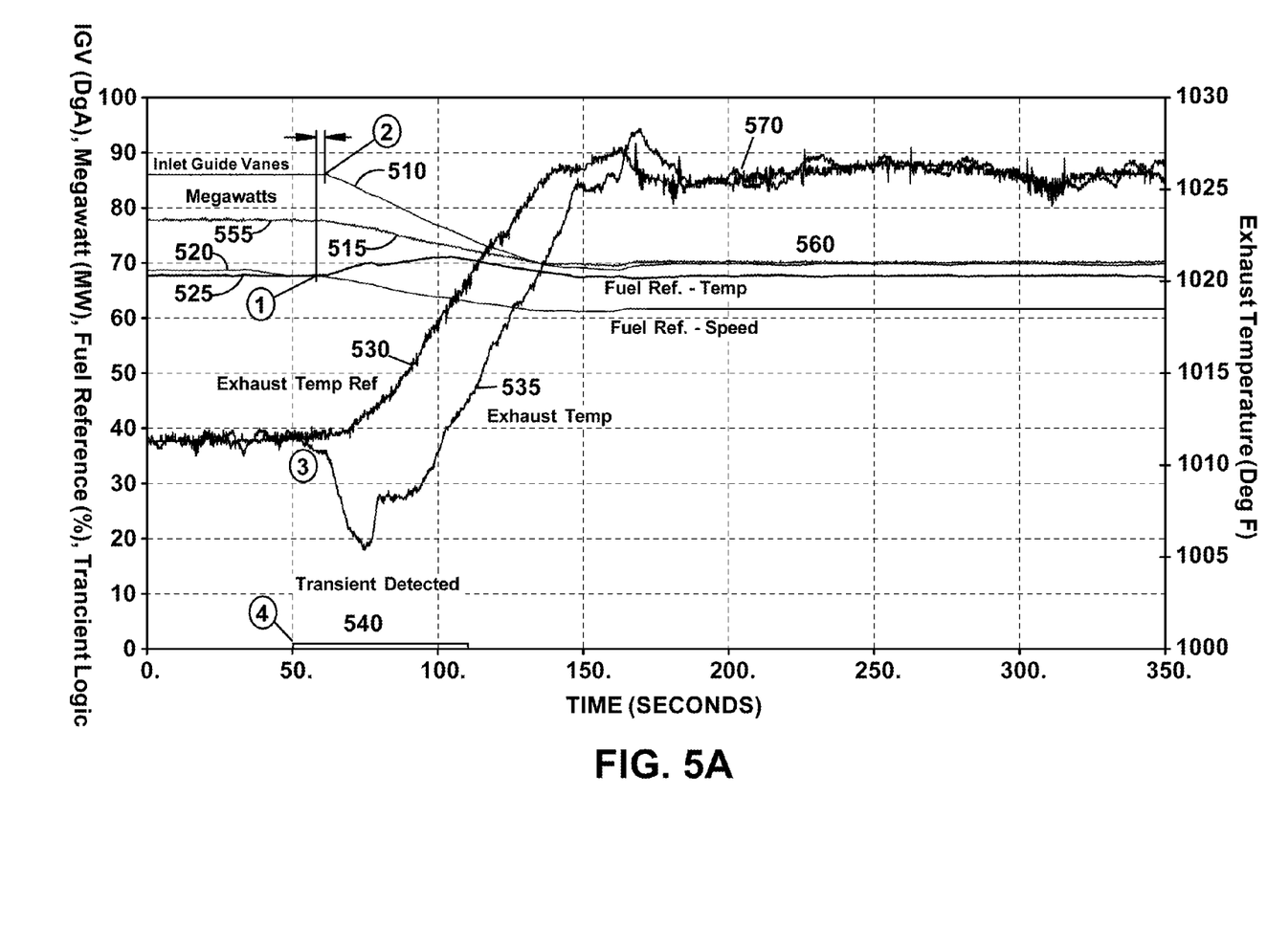
FIG. 5 illustrates a base-load to part-load transient event under an embodiment of the inventive control algorithm.
Figure 5B:
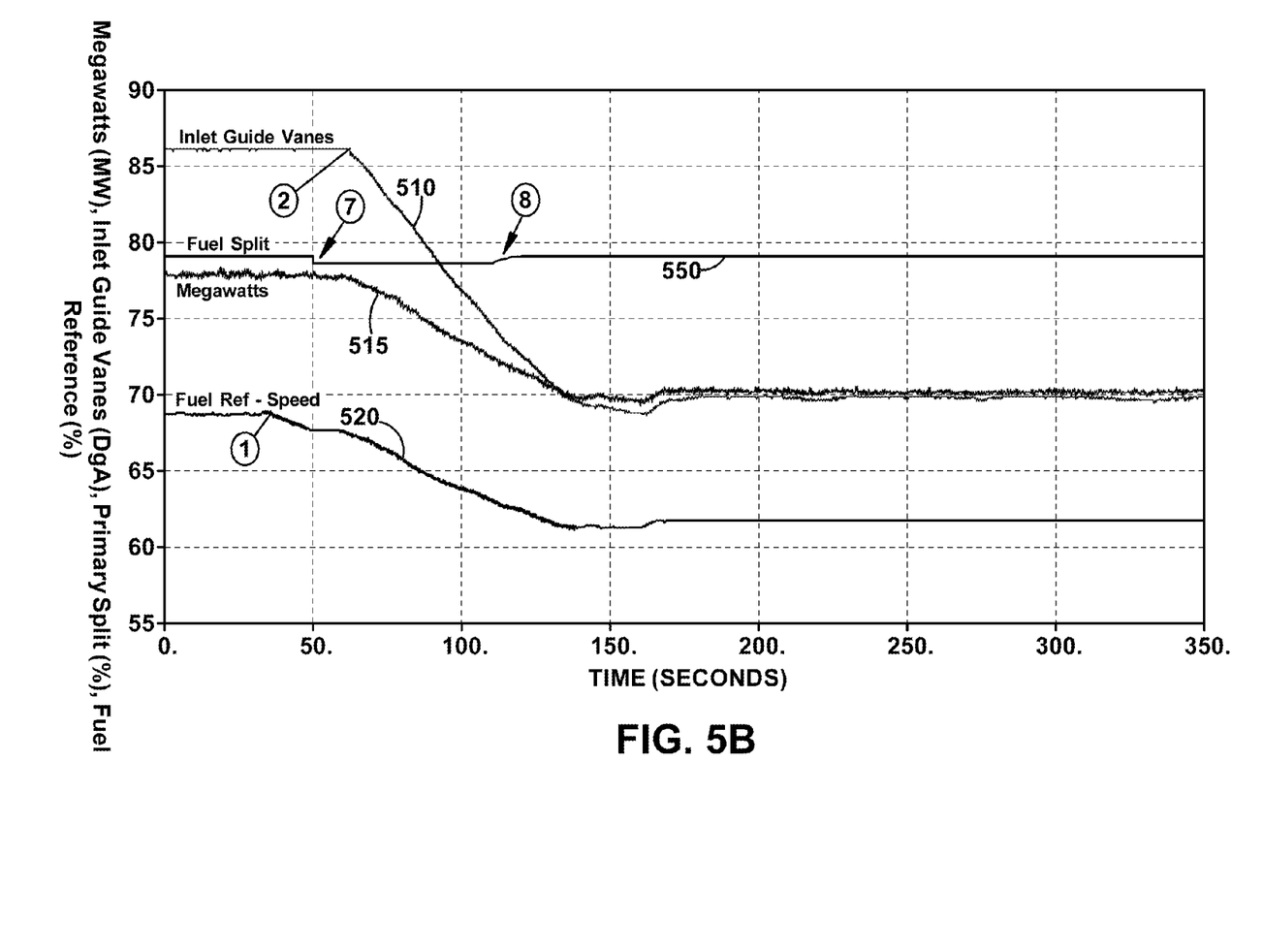

FIG. 5A and FIG. 5B illustrate a base-load to part-load transient event under an embodiment of the inventive control algorithm. Operational parameters including inlet guide vane position 510, megawatt output 515, fuel reference-speed 520, fuel reference-temperature 525, exhaust reference temperature 530 exhaust temperature 535, transient detection 540, and fuel split 550 are tracked during the power transient from base-load to part-load. Fuel reference speed 520 begins to decrease fuel as it crosses fuel reference-temperature 525 at 1, initiating a fuel reduction to the combustors consistent with the power reduction taking place in megawatt output 515 from base-load 555 to part load 560. Inlet guide vanes position 510 does not begin to close until 2, allowing the turbine to start cooling transiently as indicated by exhaust temperature 535 at 3, in the interim. The reference exhaust temperature 530 rises to reflect a new elevated setting 570 for the part-load condition. In accordance with the embodiment of the inventive algorithm, the transient event 560 is detected at 4. The immediate response is implemented in the form of a step change in fuel split 550 at 7. The change in fuel split assists in maintaining flame and preventing combustion dynamics, as previously described. At the end of a predetermined immediate response time, then the change in fuel split is ramped off at 9, this immediate response lasting for a predetermined fixed time.

Figure 6:
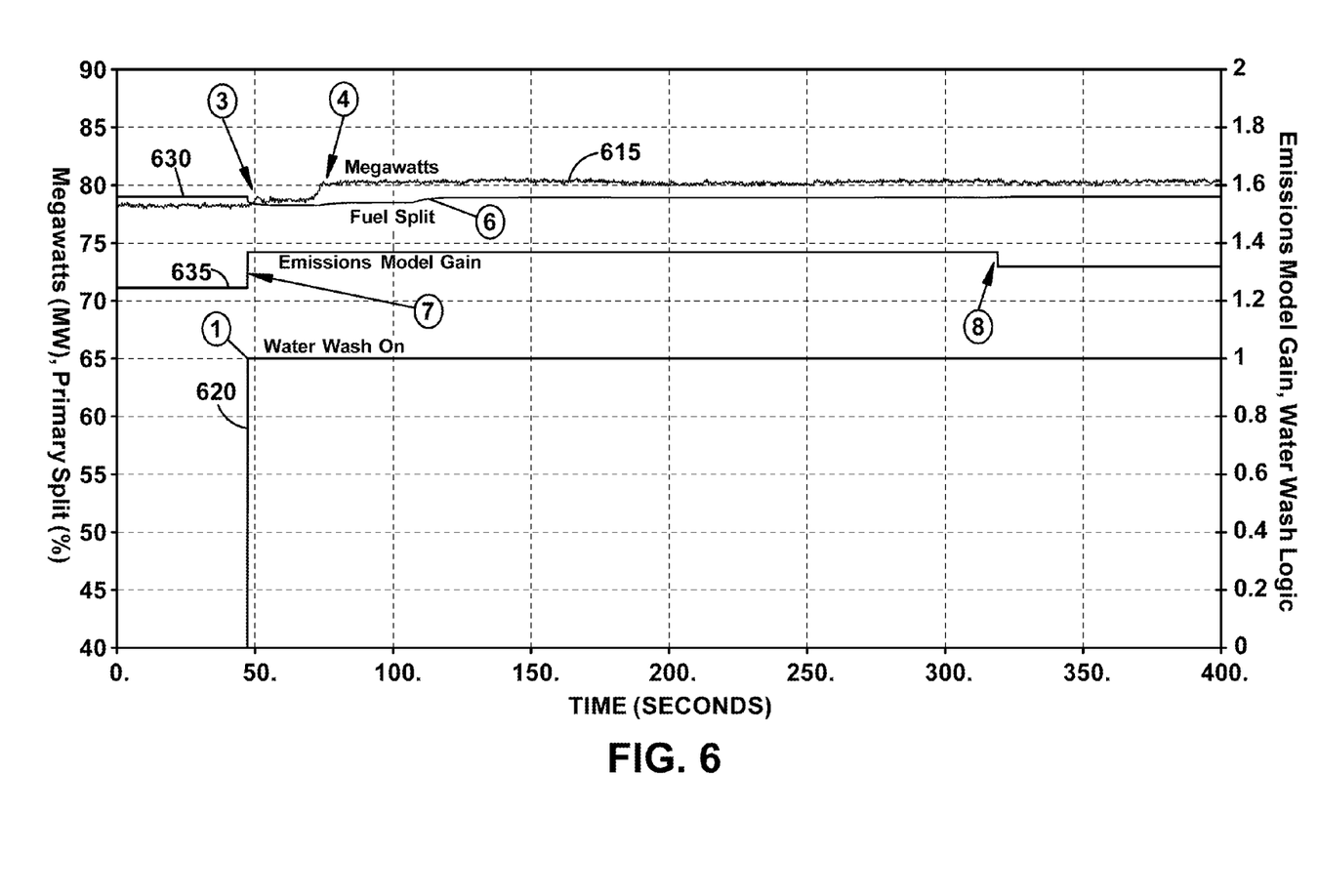
FIG. 6 illustrates a water wash on transient event under an embodiment of the inventive control algorithm.

FIG. 6 illustrates a water wash on transient event under an embodiment of the inventive control algorithm. Operational parameters, including megawatt output 615, water wash on status 620, fuel split 630, and emissions model gain 635, are tracked. As previously described, a water wash on transient introduces water through the compressor and into the turbine drawing additional heat from the turbine at 4 relative to the fuel being provided as indicated by the fuel split 630. The cooling raises the potential for combustion dynamics or flameout. The water wash on transient 620 is sensed at 1 by the inventive controller. The controller initiates an immediate response to modify fuel distribution by affecting a change in fuel split at 3, thereby acting to stabilize the flame. At the end of a predetermined immediate response time the fuel split is ramped off at 6, this immediate response lasting for a predetermined fixed time.

The water wash on transient further evokes a long-term response from the controller. The emissions model gain 635 is stepped up at 7, corresponding to water wash selected on at 1. The Closed Loop Emissions Control adjusts the emissions model gain to a value required to hold desired emissions while on water wash after steady state water wash on emissions data is available at 8.

Figure 7:
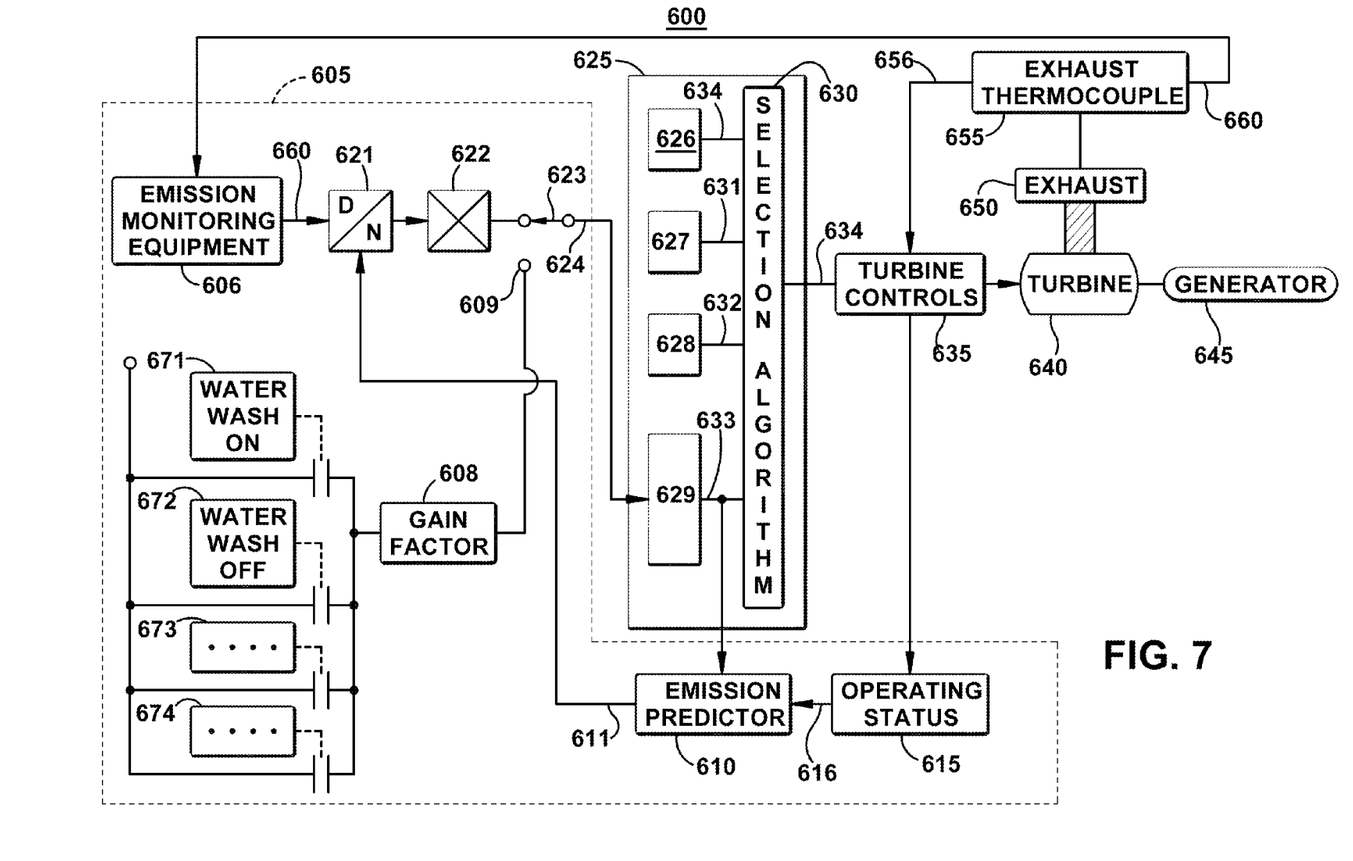
FIG. 7 illustrates a controller incorporating a long-term response to mitigate undesirable gas turbine transients using event-based actions.

A block diagram for a controller incorporating a long-term response to mitigate undesired gas turbine transient events using event-based actions is provided in FIG. 7. Control for a long-term response may include closed loop emission controls and corrected parameter controls that determine the turbine exhaust reference temperature being sent to the overall turbine operating controls. In response to a higher turbine exhaust reference temperature signal, the turbine controls may effect a change in the amount of fuel and/or the fuel split being sent to the combustors, thereby providing increased margin to combustion dynamics during these long-term transients.

FIG. 7 includes a closed loop emission control (CLEC) block 605 and a corrected parameter control (CPC) block 625 that together establish a reference exhaust temperature 626 for the turbine controls 635. The turbine controls 635 provide the direct control to the gas turbine 640. Exhaust 650 from the gas turbine 640 is monitored for parameters that include temperature 656 from turbine exhaust thermocouple 655 and turbine emissions 660. The turbine exhaust thermocouple temperature 656 is fed back to the turbine controls 635 and the turbine emissions 660 are sensed by the emissions monitoring equipment 606 of the CLEC 605.

Detecting elements (exemplary elements 671-674) of the turbine control system 635 identify the occurrence of predefined transients that require a long-term response to prevent combustion dynamics.

As described in U.S. Pat. No. 7,100,357 by Morgan et al., the Corrected Parameter Controls 625 utilize various turbine operating parameters to determine a turbine exhaust reference temperature 626 to be provided to the turbine controls 635. Four limiting algorithms, including emissions limiting algorithms 629, each provide a limiting temperature output. One of the limiting algorithms output may be selected according to a selection algorithm 630 for determining the turbine exhaust reference temperature 634.

During operation, an emissions gain signal 624 is provided by the Closed Loop Emissions Control 605 to the emissions limiting algorithm 629 of the CPC 625. The emissions gain signal 624 may be based on the emissions data 660 sensed by emissions monitoring sensor 606 and a predicted emissions signal 611. The predicted emissions signal 611 may be determined by an emissions predictor 610 utilizing the output temperature 633 from the emissions algorithm 629 of the CPC 625 and turbine operating conditions parameters 615.

When an exemplary long-term transient event 671-674 is identified, a gain selector function 623 may temporarily select gain input 609 with an increased gain factor 608. The increased gain input causes the emissions gain signal 624 to the emissions limiting algorithm 629 to increase, thereby raising the limiting temperature output 633 of the emissions limiting algorithm 629. The effect of increasing the output from the emissions limiting algorithm 629 may increase the turbine exhaust reference temperature 634 and/or fuel splits, thereby increasing the margin to combustion dynamics.

As an example: with increased turbine exhaust temperature, the emissions 660 in the turbine exhaust 650 will tend to rise. Emissions input 660 to the emissions monitoring equipment 606 will increase accordingly. Differential feedback from the Closed Loop Emissions Control emission monitoring equipment 606 and the predicted emissions signal 611 will tend to restore (tune) the emissions gain 624 provided to the CPC 625 to a more normal value. This feedback tends to restore the emissions levels to within allowable operational limits. However, to the extent that the long-term transient event changes the operating conditions of the turbine (for example a water wash extracting more energy) the emissions gain 624 may not be fully restored.

While this embodiment employs CPC for setting of the reference exhaust temperature, other control mechanisms for tunable turbine exhaust reference temperatures that may respond to signals representing long-term transient events may be considered within the scope of the present invention.

While various embodiments are described herein, it will be appreciated from the specification that various combinations of elements, variations or improvements therein may be made, and are within the scope of the invention.

The invention claimed is:

1. A controller in a gas turbine having a compressor, a combustor and a turbine with a fuel split schedule, the controller comprising:
   sensor inputs receiving data for gas turbine operational parameters;
   a fuel control system including fuel splits according to the operational parameters;
   a processor executing a program, wherein the program includes:
   a set of predetermined gas turbine transient events, including at least one transient event listed in Table I wherein a difference between a measured reference exhaust temperature and an actual turbine exhaust temperature may result in at least one of combustion dynamics or loss of flame;
   a function of recognition of the transient events from the gas turbine operational parameters based on the sensor inputs; and
   a programmed response to mitigate the effects of the gas turbine transient events on the combustion dynamics or the loss of flame.

2. The controller according to claim 1, wherein the program executed by the processor includes prioritizing the predetermined transient events according to an urgency of response.

3. The controller according to claim 1, wherein the predetermined transient events programmed in the processor require at least one of an immediate response or a long term response.

4. The controller according to claim 1, wherein the programmed response to mitigate the effects of transient events programmed in the processor comprises an immediate response to a transient event determined to require an immediate response; and
   a long-term response to a transient event determined to require a long-term response.

5. The controller according to claim 3, wherein the predetermined transient events programmed in the processor that require an immediate response comprise at least one of a base load to part load transient; a water wash on transient; an inlet bleed heat trip; a transfer to a premix purge; a grid over frequency event; or a load rejection under premix conditions event.

6. The controller according to claim 3, wherein the predetermined transient events programmed in the processor that require a long-term response comprise at least one of a water wash off transient; a water wash on transient; Closed Loop Emissions Control not being tuned for greater than a predetermined period; a spread event; a Dry Low $NO_x$ modeless event; or a loss of Closed Loop Emissions Control on a cold start during a heat soak event.

7. The controller according to claim 3, wherein the immediate response programmed in the processor comprises a step change in a fuel split schedule;
   a predetermined time delay for maintaining the fuel split step change; and
   a ramp out of the fuel split schedule to a normal fuel split schedule after the predetermined time delay has expired.

8. The controller according to claim 3, wherein the long-term response programmed in the processor comprises an emissions model gain;
   a closed loop emissions control algorithm;
   a permissive counter for summing steps in the emissions model gain minus adjustments in closed loop emission controls;
   a step change in the emissions model gain initiated in the long term response; or
   a step lockout on steps in the emission model gain when the permissive counter exceeds a predetermined count.

9. The controller according to claim 3, wherein the long-term response programmed in the processor comprises a tunable turbine exhaust reference temperature control algorithm;
   a closed loop emissions control algorithm;
   a step change in the emissions control algorithm initiated in the long term response;
   a returning of at least one of the exhaust temperature reference or the fuel split schedules in response to the step change in the emissions model.

10. A method for mitigating undesired gas turbine transient response using event-based actions wherein a difference between a measured reference exhaust temperature and an actual turbine exhaust temperature may result in at least one of combustion dynamics or loss of flame; the method comprising:
    sensing input data for gas turbine operational parameters;
    determining which event from a set of predetermined transient events included in Table I has occurred based on the sensed operational parameters; and initiating a predetermined priority of response for the predetermined transient event.

11. The method for mitigating undesired gas turbine transient response using event-based actions according to claim 10, the step of initiating a predetermined priority of response comprising:
   initiating an immediate response when a transient event requiring an immediate response is determined;
   initiating a long-term response when a transient event requiring a long-term response is determined; and
   initiating an immediate response and a long-term response when an event requiring an immediate response and a long-term response is determined.

12. The method for mitigating undesired gas turbine transient response using event-based actions according to claim 11, the step of initiating the immediate response comprising:
   initiating a step change in a fuel split schedule;
   maintaining the step change in the fuel split schedule for a predetermined time delay; and
   ramping out the fuel split schedule to a normal fuel split schedule after the predetermined time delay has expired.

13. The method for mitigating undesired gas turbine transient response using event-based actions according to claim 12, the step of maintaining the step change in fuel split schedule for a predetermined time delay comprising:
   extending the predetermined time delay if a subsequent transient event requiring an immediate response is determined during an unexpired predetermined time delay.

14. The method for mitigating undesired gas turbine transient response using event-based actions according to claim 11, the step of initiating a long-term response when a transient event requiring a long-term response is determined comprising:
   step changing an emission model algorithm gain; and
   tuning emissions with a closed loop emissions control algorithm.

15. The method for mitigating undesired gas turbine transient response using event-based actions according to claim 14, the step of initiating a long-term response further comprising
   incrementing a permissive counter at each step change in the emissions model gain due to occurrence of the transient event requiring the long-term response;
   decrementing the permissive counter at each tuning by the closed loop emission control algorithm; and
   permitting step changing of the emission model gain algorithm until a maximum permissive counter value has been reached.

16. A gas turbine comprising:
   a compressor;
   a combustor;
   a turbine;
   sensors providing data for gas turbine operational parameters;
   a fuel control system, including fuel split schedules according to operational parameters; and
   a controller including:
      sensor inputs including data for gas turbine operational parameters;
      a processor executing a program, wherein the program includes a set of predetermined gas turbine transient events, including at least one transient event listed in Table I wherein a difference between a measured reference exhaust temperature and an actual turbine exhaust temperature may result in at least one of combustion dynamics or loss of flame;
      a function of recognition of the transient events from the gas turbine operational parameters based on the sensor inputs, and
      a programmed response to mitigate the effects of the gas turbine transient events on the combustion dynamics or the loss of flame.

17. The gas turbine according to claim 16, wherein the predetermined transient events programmed in the processor require at least one of an immediate response or a long term response.

18. The gas turbine according to claim 17, wherein the immediate response programmed in the processor comprises:
   a step change in a fuel split schedule;
   a predetermined time delay for maintaining the fuel split step change; and
   a ramp out of the fuel split schedule to a normal fuel split schedule after the predetermined time delay has expired.

19. The gas turbine according to claim 17, wherein the long-term response programmed in the processor comprises:
   an emissions model gain;
   a closed loop emissions control algorithm;
   a permissive counter for summing steps in the emissions model gain minus adjustments in closed loop emission controls;
   a step change in the emissions model gain initiated in the long term response; and
   a step lockout on steps in the emission model gain when the permissive counter exceeds a predetermined count.

20. The gas turbine according to claim 19, wherein the long-term response programmed in the processor comprises:
   a tunable turbine exhaust reference temperature control algorithm.

* * * * *